United States Patent [19]
Ozolins et al.

[11] Patent Number: 4,744,806
[45] Date of Patent: May 17, 1988

[54] VARIEGATED DENSITY MESH PAD FOR MIST REMOVAL AND METHOD OF PREPARING SAME

[75] Inventors: Karlis P. Ozolins, Verona, N.J.; Ole V. Hansen, Wichita, Kans.; Jamie P. Monat, Stow, Mass.; Kenneth J. McNulty, Atkinson, N.H.

[73] Assignee: Koch Engineering Company, Inc., Wichita, Kans.

[21] Appl. No.: 9,359

[22] Filed: Jan. 30, 1987

[51] Int. Cl.⁴ .............................................. B01D 39/10
[52] U.S. Cl. ...................................... 55/97; 55/185; 55/487; 55/489; 55/DIG. 17; 55/DIG. 25; 210/DIG. 5
[58] Field of Search ................................ 55/183–188, 55/486–489, 424, 259, DIG. 17, DIG. 25; 210/DIG. 5

[56] References Cited

U.S. PATENT DOCUMENTS

| | | | |
|---|---|---|---|
| 3,262,578 | 7/1966 | Dennis | 55/487 X |
| 3,500,615 | 3/1970 | Meek | 55/489 X |
| 3,721,869 | 3/1973 | Walker | 55/487 X |
| 3,733,792 | 5/1973 | Taylor | 55/DIG. 25 X |
| 4,086,070 | 4/1978 | Argo et al. | 55/185 X |

OTHER PUBLICATIONS

York Demisters Bulletin, #30, Otto H. York Co., Inc., 1961.

*Primary Examiner*—Charles Hart
*Attorney, Agent, or Firm*—Richard P. Crowley

[57] ABSTRACT

A variegated density mist eliminator pad for use in gas-liquid contacting devices for the removal of mists from a mist-containing gas stream which pad comprises a plurality of fibrous elements such as a knitted or woven mesh having open areas for the flow of the gas stream therethrough and characterized by defined adjacent regions of different, i.e. high and low, fiber density with the direction of density variation generally perpendicular to the direction of gas flow, the high density region within the pad permitting enhanced drainage of coalesced liquid, and a method of preparing the high and low density regions through a nesting and non-nesting relationship of fibrous layers.

24 Claims, 2 Drawing Sheets

VARIEGATED DENSITY MESH PAD FOR MIST REMOVAL AND METHOD OF PREPARING SAME

BACKGROUND OF THE INVENTION

Mist eliminator mesh pads are typically pads composed of elements, such as knitted wire mesh, and are commonly placed in a gas-liquid contact apparatus to remove mists from a mist-containing gas stream. Typically, such mist eliminator mesh pads are composed of fibrous or filament elements, such as four to fifteen mil diameter stainless steel wire and are arranged from about three to twenty-four inches in thickness, have a density ranging from about four to fifteen pounds per cubic foot and range in diameter from about one to thirty feet depending upon the gas-liquid contact apparatus in which the pads are employed. Such mist eliminator mesh pads are generally effective in removing droplets as small as one to five micrometers from mist-containing gas streams.

The capacity of a mist eliminator mesh pad in a gas-liquid contact apparatus, i.e. the maximum gas velocity of the gas stream through the mesh pad, is generally limited by the mesh pad's ability to drain rapidly the coalesced liquid collected by the mesh pad. One attempt to increase the capacity of mist eliminator mesh pads and to reduce the mesh pad's pressure drop has been the employment of drainage cylinders or ancillary rolls of wire mesh fixed to the bottom of conventional mist eliminator mesh pads. Such drainage cylinder or ancillary rolls provide for localized, separate regions of flow interruption and interception, therefore creating preferential drainage foci. (See for example U.S. Pat. No. 4,022,593, issued May 10, 1977, hereby incorporated by reference in its entirety.)

In some limited cases, it has been the past practice to employ variable high and low density mesh pads in a vapor phase intercept pattern to enhance mist elimination performance. In such cases, the lower portion of the mesh pad is formed of a low density material to promote rapid and easy draining of coalesced liquid and to aid in working away precipitated material from the pad, while the upper portion of the pad is formed of a high density material to collect liquid particulates from the upwardly flowing, mist containing vapor stream.

It is desirable to provide an improved mist eliminator mesh pad in order to improve the mesh pad capacity and to provide for reductions in pressure drop compared to conventional mesh pads.

SUMMARY OF THE INVENTION

The invention relates to mesh pads, to the method of preparing such mesh pads and of using such mesh pads in gas-liquid contact, such as mist eliminator, apparatus. Particularly, the invention relates to a variegated density, mist eliminator mesh pad having increased capacity and low pressure drop.

An improved mesh pad has been discovered particularly for use in gas-liquid contact apparatus for the removal of mists from mist-containing gas streams which mesh pad provides for defined localized regions of higher density and consequently enhances drainage within the mesh pad itself with the direction of variegated density generally perpendicular to the direction of gas flow. The mesh pad is variegated in density, that is the density of the mesh pad varies in a defined, controlled manner within the mesh pad itself in a direction generally perpendicular to the direction of the gas flow.

The improved mist eliminator mesh pads are characterized by a higher capacity as a result of the enhanced drainage from the mesh pad's high density regions as well as lower pressure drops when using the pad. The mist eliminator mesh pads are composed of a plurality of formed, fibrous elements, typically knitted or woven and having open areas for the flow of a gas stream therethrough and characterized within the mesh pad by defined adjacent areas of high and low density, with the high, localized density regions providing for the enhanced drainage of coalesced liquid from the mesh pad, while the low density regions provide a low-resistance path for gas flow and mist removal.

The mesh pad of the invention may assume various forms such as a horizontal or vertical mesh pad comprised of mesh layers which are stacked or spiral wound, which pad is characterized by localized regions of lower or higher density where the direction of density variation is generally perpendicular to the direction of gas flow. One method of achieving density variation is to place two or more layers of fibrous elements in a close contacting, non-nesting or nesting arrangement. In the nesting position, the layer of fibrous elements, is placed in contact with another layer of fibrous elements, either the same or different, and the fibrous elements nest in a close mating, nesting, cooperative-type relationship to form a layer of higher density, that is, a layer of about twice the density of either layer alone. In a non-nesting position, each layer of the fibrous elements is not engaged in a full or substantial cooperative mating relationship and there is little, if any, change in the fiber density between the two adjacent layers.

It has been discovered that by placing corrugated layers of fibrous elements, such as stainless steel woven or knitted mesh, together in either a nesting and non-nesting or a plurality of nesting and non-nesting positions, localized regions of higher density and thus enhanced drainage, can be formed. For example, in the preparation of one-piece spiral wound mesh pads, such mesh pads may be formed by winding the layer of corrugated mesh in a spiral fashion around a central axis. At fixed distances from the axis, a high density region is created by interwinding a layer of corrugated mesh that nests fully or substantially into the adjacent mesh layer to form a region of higher mesh density. At other intermittent fixed distances from the central axis, low density regions are created by interwinding layers of corrugated mesh that do not nest substantially or fully together so as to form a non-nesting, low density region. The result is a spiral wound mesh pad that is variegated in density, that is, the density of the mesh pad varies as desired with the radial distance from the mesh pad's central axis. Gas flow through such a mesh pad would be in the axial direction. Experimental tests with such variegated mesh pads have demonstrated a higher capacity of the mesh pad as a result of enhanced drainage from the mesh pad's higher density regions as well as a low pressure drop when such mesh pads are employed in a gas-liquid contact device for mist elimination.

The concept of density variegation in mist eliminator mesh pads of the invention is not limited to those mesh pads which are formed by spiral winding, but applies to all mist eliminator mesh pads in which there are two or more adjacent areas of different mesh density and when the direction of density variation is generally perpendicular to the direction of gas flow. The fibrous or other elements and materials employed in the mesh pads may be the same or different, but typically comprise a metal wire mesh, such as knitted or woven stainless steel or may comprise polymeric fibers or filaments. Generally, the mist eliminator mesh pads would have areas of defined high and low density, either formed from the same or different fibrous elements and may be of the same or different thicknesses and different densities. For example, for stainless steel wire mesh pads, the density may range from densities of four to fifteen pounds per cubic foot for the low density, to eight to thirty pounds per cubic foot for the high density regions.

The knitted, woven or other fabric-type material used to form mesh pads for mist eliminators generally comprises a double layer of fiber or filament material, typically metal wire or plastic filaments. A variety of means may be used to obtain density variation within the mesh pad in a direction generally perpendicular to the direction of gas flow. One such means, particularly useful for metal mesh pads, is to corrugate the double layer of knitted or woven material to form ridges or peaks and valleys. A high density region is formed when the peaks of one layer fit or "nest" into the valleys of the adjoining layer, while low density or regular regions are formed when the peaks of one layer hit the peaks of the adjoining layer and do not nest. The thickness of any particular high or low density area can be controlled by the number of cooperatively mating engagements of each layer made.

In one embodiment, the mesh pad is formed as a cylindrical spiral by winding two layers of corrugated wire mesh about the axis of rotation. For the low density regions, the corrugations of the said layers are at different angles with respect to the said axis and do not nest together. For the high density regions, the corrugations of the two layers lie at the same angle with respect to the axis so that the layers nest together. In another embodiment, layers of corrugated wire mesh are maintained in a planar configuration with the plane of the layers parallel to the direction of the gas flow. Density variegation is accomplished by placing adjacent layers in either a nesting or non-nesting arrangement. The number, height and thickness of the layers may vary, as desired, with the layers of high density usually of the same but typically less thickness, e.g. one to eight inches, than the low density layers. The number of layers, e.g. in the nesting or non-nesting, may vary, such as two to twelve, e.g. four to eight. The height of the pad may vary, as desired, e.g. four to twelve inches or more.

Another means of obtaining a variegated density in mesh pad mist eliminators is to vary the crimp height or thickness of the corrugated layers, i.e., the height of the peaks and depth of the valleys or in adjacent regions of the mesh pad. The greater the crimp height, the lower the density. The mesh pad of the invention would then comprise a pad in which the low density regions contain non-nesting mesh having a relatively large crimp height, and the high density regions contain nesting or non-nesting mesh having a relatively small crimp height or being uncorrugated.

Yet another means of obtaining a variegated density in mesh pad mist eliminators is to use parallel knit material or other high density material in conjunction with monofilament knit material or other low density material in adjacent regions of the mesh pad. Monofilament material is made by using a single wire or filament in the knitting process while parallel knit material or multifilament material is made by using a bundle of several wires or filaments in parallel in the same knitting process, e.g. up to twelve filaments, such as four to eight. The parallel knit material has a higher density than the monofilament material. The mesh pad of the invention would then comprise a pad in which the low density regions contain monofilament mesh while the adjacent high density regions contain parallel knit, multifilament mesh.

Other techniques can also be used to vary the density of mesh layers within the mesh pad. These techniques include using different materials, e.g. plastic and metal, in the high and low density regions, using different filament diameters in the high and low density regions, or using a more tightly knitted or woven mesh in the high density regions. It is essential that the density variation is in a direction perpendicular to the direction of gas flow.

Another configuration for the mist eliminator mesh pads comprises a box-type structure wherein an interior, low density mesh is fully or partially surrounded by an exterior, high density mesh layer, all of which mesh layers represent different embodiments of the concept of a mesh-layered density variegation through employing fibrous elements in a nesting and non-nesting arrangement.

A mesh pad with enhanced drainage can be prepared by incorporating a region of higher density extending downwardly from the mesh pad into the gas flow path so as to permit coalesced liquid from the higher density region of the variegated mesh pad to drain from the extending, higher density layer. For example, for variegated mesh pads used in vertical flow mist elimination, the extensions e.g. one-half to four inches, of the high density mesh layers from the bottom of the cylindrical pad, which extension is in contact with the higher density layer formed in the pad, enhances drainage of coalesced liquid from the higher density region.

The improved mist eliminator mesh pads of the invention are typically employed by placing one or more layers of the mesh pads in a gas-liquid contact apparatus and permitting the flow of a mist-containing gas stream through the mesh pads thereby providing for coalescence of liquid from the gas stream and the draining of coalesced liquid from the mesh pad.

The invention will be described for the purposes of illustration only in connection with certain embodiments; however, it is recognized that various changes, modifications, additions and improvements may be made in the illustrated embodiment by those persons skilled in the art without departing from the spirit and scope of the invention.

DESCRIPTION OF THE EMBODIMENTS

Figure 1:
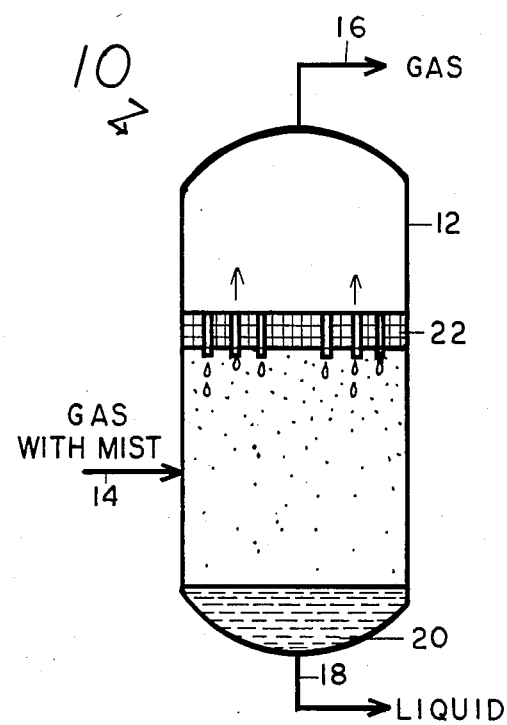
FIG. 1 is an illustrative, sectional view of a gas-liquid contact tower containing a layer of the mist eliminator mesh pad of the invention.

FIG. 1 shows a gas-liquid contacting system 10 which comprises a gas-liquid contact tower 12 having an inlet at the lower portion thereof 14 for the introduction of a mist-laden gas stream in which the mist particles are to be removed, and an upper portion 16 for the removal of a mist-laden gas stream and a lower outlet 18 for the removal of coalesced liquid 20 from the gas-liquid tower 12. Across the diameter of the tower is shown a variegated density, mist eliminator mesh pad of the invention 22 which mesh pad is placed in the gas flow path of the mist-containing gas stream, and is a cylindrical, spiral-wound mesh pad 22, spiral-wound to the dimensions of the gas-liquid contact tower 12.

Figure 3:
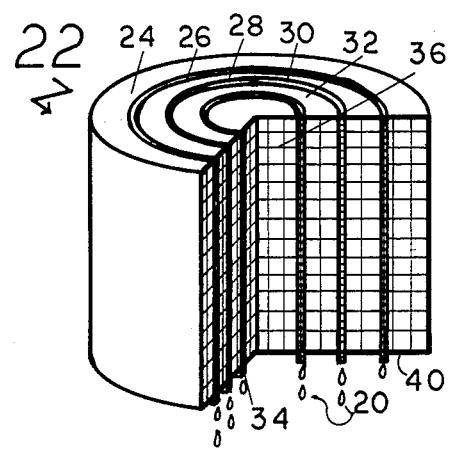
FIG. 3 is an enlarged perspective partial sectional view of the mist eliminator mesh pad of FIG. 1.
Figure 2:
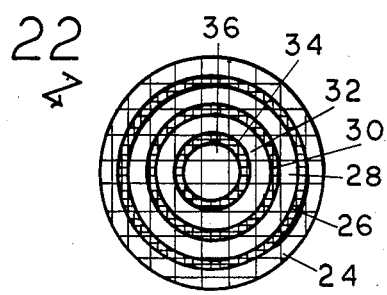
FIG. 2 is a top plan view of the mist eliminator mesh pad of FIG. 1.

FIGS. 2 and 3 are enlarged views of the variegated mesh pad 22 showing high density mesh layers 26, 30 and 34 providing a plurality of spiral-wound, higher density regions, e.g. two to six or three as illustrated, and layers 24, 28, 32 and 36 providing a plurality of low-density regions, e.g. two to six or four as illustrated. The high density regions provide for the coalescing and drainage of coalesced liquid 20. As illustrated, the high density region may extend slightly downward from the upstream face 40 of the mesh pad to promote more rapid drainage from the mesh pad.

Figure 4:
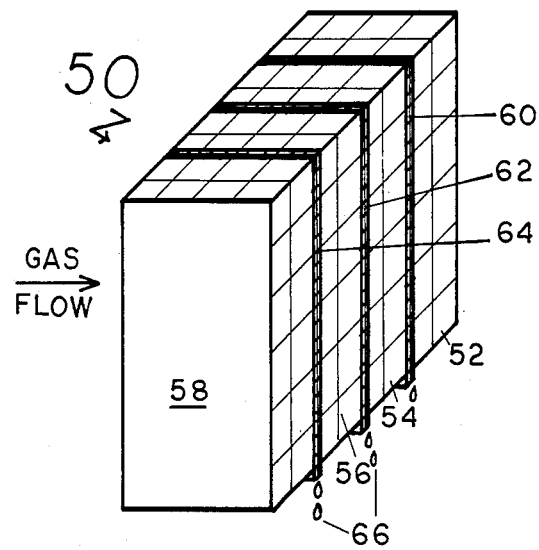
FIG. 4 is a sectional view of a variegated density mesh pad in which the layers of mesh lie in adjacent planes.

FIG. 4 is a perspective partial sectional view of a horizontal flow, variegated density mesh pad 50 with alternate layers of high and low density mesh with the lower density layers in regions 52, 54, 56 and 58 of greater thickness than the higher density layers in regions 60, 62 and 64, the plane of the layers or regions disposed parallel to the gas flow and with the coalesced liquid 66 draining from the lower section of the high density layers or regions 60, 62 and 64. Optionally, these high density layers 60, 62 and 64 may be extended slightly downward from the bottom surface of the mesh pad 50 to promote rapid drainage from the extended high density regions. This same configuration can be used in vertical flow rather than the spiral-wound configuration. In this case, the coalesced liquid would drain downward into the rising mist-containing gas stream.

Figure 5:
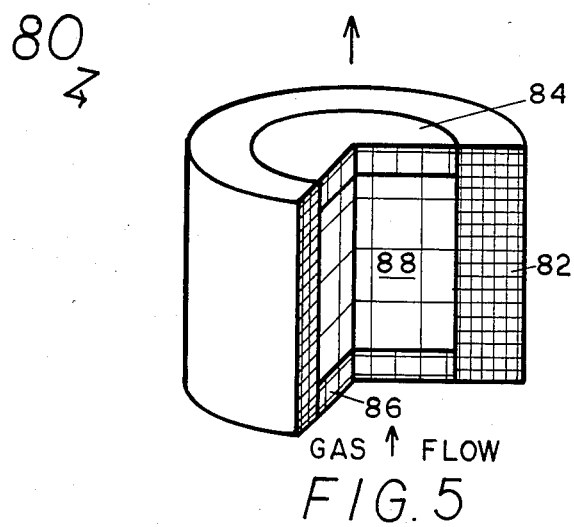
FIG. 5 is a perspective partial sectional view of a box mist eliminator mesh pad.

FIG. 5 is a perspective partial sectional view of a box-type mist eliminator mesh pad 80 composed of low, high and medium density knitted or woven wire mesh layers, in generally circular form, for enclosing a central space and for insertion into a gas-liquid column. The pad 80 comprises a tubular layer composed of high density mesh layer 82, e.g. over 15 pounds per cubic foot, a circular top layer of medium density mesh 84, e.g. 8 to 12 pounds per cubic foot, and a lower upstream low density layer 86, e.g. less than 6 pounds per cubic foot, the layer enclosing an empty cylindrical space 88. In mesh pad 80, mist from the mist-containing gas stream passes axially upward through the low density coalescing layer 86 into space 88 (which optionally may contain another layer or be filled in whole or part with a mist-coalescing device such as fiber) and upwardly through layer 84, while also passing peripherally upward through the surrounding high density layer 82 which aids in draining the coalesced liquid from the mesh pad 80 about the lower outer periphery of the pad.

Figure 6:
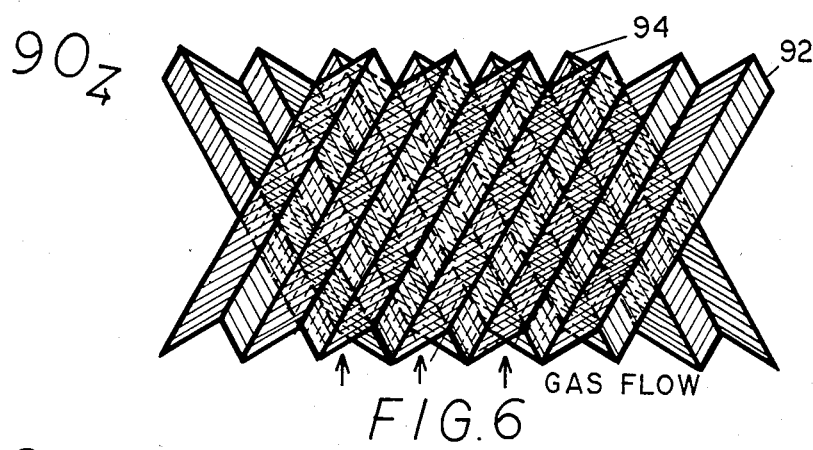
FIG. 6 is an enlarged fragmentary view of two-non-nesting, corrugated knitted mesh layers of a low-density region of FIG. 2.

FIG. 6 illustrates two layers of corrugated knitted wire mesh 90 comprising non-nesting, angularly disposed, e.g. 10° to 60°, e.g. 30°, corrugated knitted mesh layers 92 and 94 arranged in a low density, non-nesting relationship to provide the usual low density area or region of a mesh pad.

Figure 7:
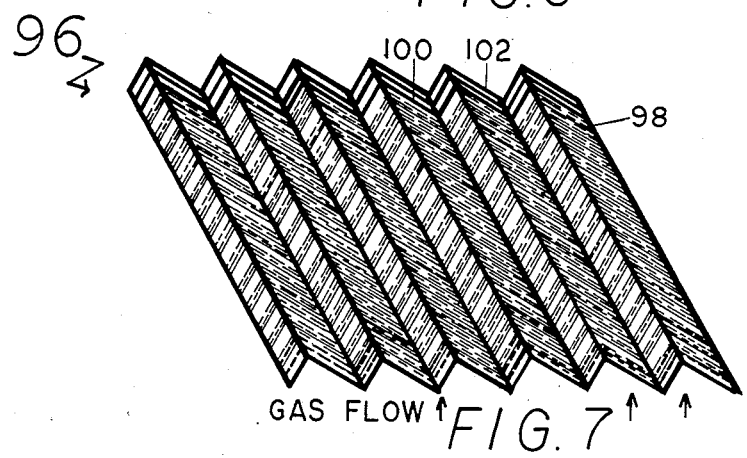
FIG. 7 is an enlarged fragmentary view of two nesting, corrugated knitted mesh layers of a high density region of FIG. 2.

FIG. 7 illustrates two layers of corrugated knitted wire mesh 96 composed of three nesting corrugated mesh layers 98, 100 and 102 to provide a high density drainage mesh pad layer, with the adjacent layers nesting along the corrugations.

As illustrated, the variegated mesh pad may vary in thickness and in height of the high and low density layers; however, such pad includes two or more adjacent regions of different density wherein the direction of density variation is generally perpendicular to the direction of gas flow.

Certain comparative tests were conducted to illustrate the improvement in capacity of the low-high density, variegated mesh pads and prior art low density mesh pads composed solely of the low density mesh. The variegated mesh pad was that illustrated in FIGS. 2 and 3 wherein the density was varied as illustrated in FIGS. 6 and 7. Table 1 gives the physical characteristics of the two mesh pads tested. Both pads were tested under identical conditions in a three-foot diameter, vertical flow, transparent tower using a nozzle to spray a water mist into the air stream below the mist eliminator.

The pressure drop and the critical velocity at different gas flow rates and liquid loadings for both mesh pads were measured. The results obtained are presented in Tables 2 and 3. Enhanced drainage from the higher density regions of the variegated mesh pad was observed during the test. This accounts for the higher capacity and lower pressure drop of the variegated mesh pad as indicated in Tables 2 and 3.

TABLE 1

| Physical Characteristics of Mesh Pads Tested | | |
|---|---|---|
| | Variegated Pad | Conventional Pad |
| Diameter (ft.) | 3 | 3 |
| Height (in.) | 6 | 6 |
| Configuration | Spiral | Spiral |
| Density (lb./ft.$^3$) | 9 (low) | 9 |
| | 18 (high) | |
| Variegated Thickness (in.) | 4 (low) | Uniform |
| | 1 (high) | |

TABLE 2

VARIEGATED MESH PAD TEST RESULTS
Pressure Drop Δ P (in H$_2$O)

| Liquid Loading (gpm/ft$^2$) | Mesh Pad Design | Gas Phase Velocity (ft/sec) | | | | |
|---|---|---|---|---|---|---|
| | | 4 | 6 | 8 | 10 | 11 |
| 0 | Variegated | 0.069 | 0.136 | 0.218 | 0.318 | 0.370 |
| | Conventional | 0.073 | 0.140 | 0.220 | 0.320 | 0.370 |
| 0.3 | Variegated | 0.09 | 0.170 | 0.28 | 0.47 | 0.6 |
| | Conventional | 0.09 | 0.180 | 0.32 | 0.62 | 0.92 |
| 2.5 | Variegated | 0.10 | 0.220 | 0.48 | 1.05 | 1.65 |
| | Conventional | 0.10 | 0.240 | 0.62 | 1.70 | 2.25 |

TABLE 3

| COMPARISON: VARIEGATED MESH PAD WITH CONVENTIONAL MESH PAD | | | | |
|---|---|---|---|---|
| | $V_c$ (ft/sec) @ 0.3 gpm/ft$^2$ | $V_c$ (ft/sec) @ 2.5 gpm/ft$^2$ | Pressure Drop (inches of water) at 8 ft/sec and 2.5 gpm/ft$^2$ | Pressure Drop (inches of water) at 11 ft/sec and 2.5 gpm/ft$^2$ |
| Variegated Mesh Pad | 12.49 | 10.66 | 0.48 | 1.65 |
| Conventional Mesh Pad | 12.09 | 10.33 | 0.62 | 2.25 |
| % Improvement of Variegated Mesh Pad | 3.3% | 3.2% | 23% | 26.7% |

$V_c$ = critical velocity where droplets get re-entrained (i.e., the maximum allowable operating velocity)

We claim:

1. A mist-eliminator variegated density mesh pad suitable for use in gas-liquid contact devices for the removal of mists from mist-containing gas streams, which pad comprises open areas to permit the flow of a gas stream therethrough and characterized within the pad by defined, adjacent regions of high and low densities, said high and low density regions comprising a plurality of layers of corrugated, woven or knitted fibrous mesh material characterized by peaks and valleys, the high density region having said layers disposed in a nesting relationship, and the low density region having said layers disposed in a non-nesting relationship, with the direction of high and low density variegation generally perpendicular to the direction of the gas flow to provide for enhanced drainage of liquid from the high density region.

2. The mesh pad of claim 1 wherein the low density region varies from about four to fifteen pounds per cubic foot, and the high density region varies from about eight to thirty pounds per cubic foot.

3. A gas-liquid contact apparatus which includes the mesh pad of claim 2, the pad extending across the flow path of the mist-containing gas stream, and the axis of the pad substantially aligned with the axis of the gas flow.

4. The mesh pad of claim 1 wherein the low density region comprises monofilament fibrous elements and the high density region comprises multifilament fibrous elements.

5. The mesh pad of claim 1 wherein one or more of the low density regions comprise non-nesting layers of mesh material of high crimp height and one or more of the high density regions comprise nesting layers of mesh material of low crimp height.

6. The mesh pad of claim 1 which pad comprises a cylinder composed of attending integral defined cylindrical layers of high and low density regions extending outwardly and parallel to the axis of the mesh pad.

7. The mesh pad of claim 1 wherein the non-nesting low density regions have the non-nesting adjacent layers disposed at an angle of about ±10 to ±60 degrees from the direction of gas flow.

8. The mesh pad of claim 1 which comprises a box-type mesh pad which comprises:
   (a) a tubular layer of a high density region;
   (b) a top layer of a medium density region; and
   (c) a lower layer of a low density region.

9. The mesh pad of claim 8 wherein the high density region has a density of over 15 pounds per cubic foot; the medium region has a density of about 8 to 12 pounds per cubic foot; and the low density region has a density of less than 6 pounds per cubic foot.

10. The mesh pad of claim 8 wherein the mesh pad is characterized by an empty central region within the mesh pad.

11. The mesh pad of claim 10 wherein the said central region contains mist-eliminating fibers.

12. The pad of claim 1 wherein the high and low density regions vary in thickness from about one to eight inches.

13. A gas-liquid apparatus which includes the mesh pad of claim 1.

14. A mesh pad of claim 1 wherein the pad includes one or more high density regions extending outwardly from the mesh pad body and generally axially upstream into the mist-containing gas stream to permit rapid drainage of coalesced liquid from the high density regions.

15. The mesh pad of claim 1 wherein the mesh pad comprises alternating layers of high and low density regions with the low density regions of greater thickness than the high density regions.

16. The mesh pad of claim 14 wherein the high density region extends from about one-half to four inches.

17. The mesh pad of claim 1 which includes a high density region about the outer exterior of the mesh pad.

18. A method of preparing a variegated density mesh pad for use in gas-liquid contact devices, which method comprises:
   placing a plurality of layers of corrugated, woven or knitted fibrous mesh material, characterized by peaks and valleys, in a nesting relationship to form at least one high density drainage region and into a non-nesting relationship to form at least one adjacent low density region to prepare a variegated density mesh pad for removing mists from a mist-containing gas stream with the high density region providing enhanced drainage of coalesced mist.

19. The method of claim 18 wherein the said layers of corrugated fibrous mesh materials are placed at an angle to one another to form a non-nesting, low density region and placed generally parallel to one another to form a nesting, high density region.

20. The method of claim 18 which includes placing the non-nesting layer at an angle to each other layer of about ±10 to ±60 degrees from the direction of gas flow.

21. The method of claim 18 which includes forming alternate low and high density regions within the mesh pad of defined thickness.

22. The method of claim 18 which includes forming a high density region on and about the exterior outer periphery of the mesh pad.

23. The mesh pad produced the by the method of claim 18.

24. A method of removing mist from a mist-containing gas stream which comprises placing the mesh pad of claim 1 in a gas-liquid contact apparatus.

* * * * *